Dec. 4, 1962  G. HOLLAND  3,066,619
FREIGHT LOADING DEVICE
Filed April 25, 1960  4 Sheets-Sheet 1

Inventor
GEOFFREY HOLLAND
Attorney

Dec. 4, 1962 G. HOLLAND 3,066,619
FREIGHT LOADING DEVICE
Filed April 25, 1960 4 Sheets-Sheet 2

Inventor
GEOFFREY HOLLAND

Dec. 4, 1962  G. HOLLAND  3,066,619
FREIGHT LOADING DEVICE
Filed April 25, 1960  4 Sheets-Sheet 3

Inventor
GEOFFREY HOLLAND
Attorney

Dec. 4, 1962   G. HOLLAND   3,066,619
FREIGHT LOADING DEVICE
Filed April 25, 1960   4 Sheets-Sheet 4

Inventor
GEOFFREY HOLLAND
Attorney 3,066,619
FREIGHT LOADING DEVICE
Geoffrey Holland, 1470 Water St., Kelowna,
British Columbia, Canada
Filed Apr. 25, 1960, Ser. No. 24,484
5 Claims. (Cl. 105—368)

This invention relates to the loading and unloading of trailers for railway flat cars. The system of loading trailers on flat cars is known as "piggy back" in which the goods are packed or loaded in trailers resembling box cars and tractors are utilized for loading or unloading these trailers on flat cars.

At present in railroad practice the trailers are loaded in a progressive or consecutive order on the assembled flat cars and the trailers which have to be unloaded last are driven on to the flat cars up to the flat car nearest the locomotive. When the train is made up the trailers which have to be unloaded at intervening points between the place of departure and the place of destination of the train are in progressive order from the back of the train to the front of the train and each flat car is uncoupled at its destination and the loaded trailer is subsequently unloaded. If the flat car has to be side tracked then shunting operations have to be carried out by the locomotive and train crew to permit of the uncoupling of the flat car, and only after this shunting operation is completed then the train may proceed on its journey. It will be evident that this arranging of trailers in predetermined order on flat cars to suit the uncoupling of the flat car is a complicated and time consuming procedure and the loss of man hours in carrying out this procedure is costly, uneconomical and inefficient.

I realize that the problem of devising a more economical and efficient system is of great importance and before I arrived at a solution it was necessary to fulfil the following objects.

One of the objects of my invention was to provide a system and mechanism for loading and unloading trailers on and from flat cars without the necessity of prearranging the trailers in any consecutive order of unloading and to permit of the trailers being loaded on any available flat car irrespective of its location in the train with the knowledge that it can be subsequently unloaded from the train with efficiency and dispatch.

Another object of my invention is to so design my loading and unloading mechanism that it can be installed on standard flat cars now in use.

A further object still is to dispense with shunting and/or uncoupling of flat cars loaded with trailers but to facilitate unloading the trailers when the train has arrived at the unloading platform relying only on the use of power of the locomotive during its regular forward movement to position the flat car so that a trailer may be readily coupled to a tractor and the unloading accomplished efficiently and without delay.

Another object still of my invention is to superpose on the deck of a standard flat car a plurality of rollers on which my loading platform can be mounted, the platform having freedom to be rotated on a horizontal plane and in parallel relation to the deck of the car through an arc of approximately 90°.

A further object still of my invention is to readily and accurately lock the superposed platform in position horizontally of the flat car deck with the longitudinal axis of the platform registering with the longitudinal axis of the flat car.

Still another object of my invention is to obviate any possibility of lateral displacement of a loaded trailer on the platform.

A further object still of my invention is to firmly lock a loaded trailer against inadvertent longitudinal displacement on a flat car.

Other objects of my invention will be disclosed as the specification develops.

So that the nature of my invention will be readily understood, I have illustrated an embodiment of the same which I shall describe in detail, but I wish it to be understood that I do not limit my invention to this specific structure but reserve the right to modify or alter such structure within the scope of my appended claims, without departing from the spirit of my invention.

In the drawings.

Like characters of reference refer to like parts in the several figures of the drawings.

Figure 1:
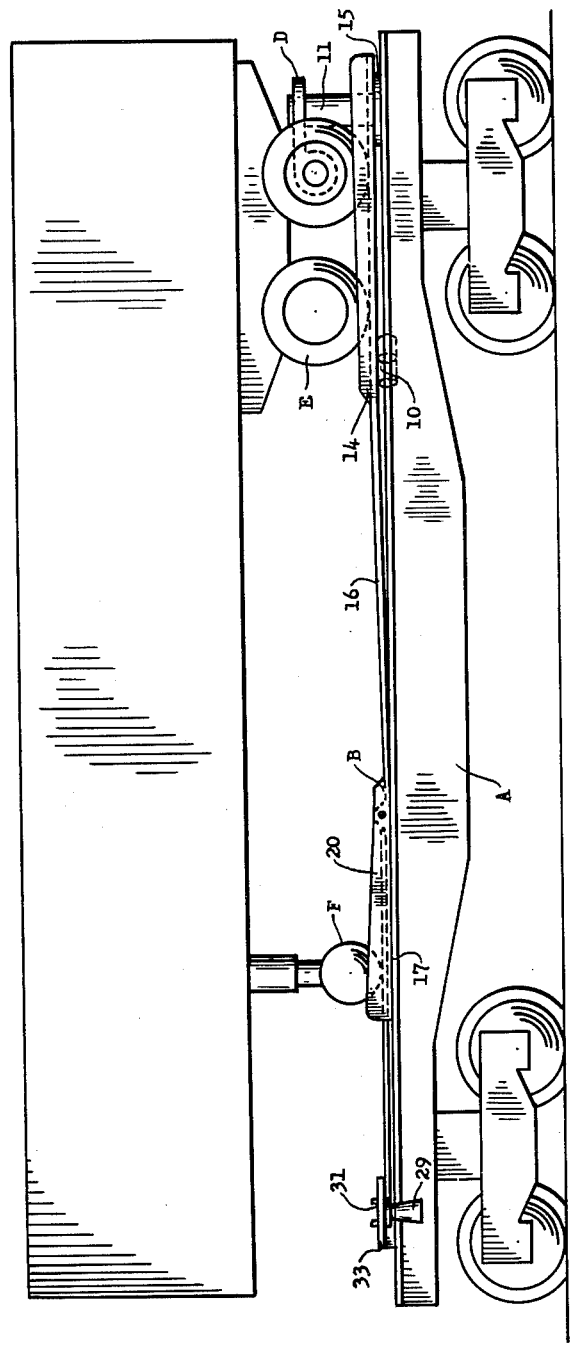
FIGURE 1 is a side elevation of a railroad flat car equipped with my loading and unloading device, and showing a trailer mounted thereon.

Referring to the drawings, A represents a railroad standard flat car deck, and B my loading device operatively mounted on the deck of the flat car. On the deck of the flat car and adjacent to the front end thereof I provide a plurality of rollers 10 which are rotatively mounted on the flat car deck, and these rollers are equidistantly spaced from each other and concentrically arranged around the fulcrum post 11 which is securely mounted on the flat car deck.

The loading device B is formed as a unit in the form of a plate having at the rear end a rectangular portion 12 provided with an orifice 13 which loosely engages the fulcrum post 11 which is rigidly secured to the deck of the flat car.

The marginal lateral portions of the rectangular rear portion 12 are offset upwardly to form spaced flanges 14 which extend the length of the rectangular rear portion 12 of the plate.

It will be noted that the orifice 13 is located adjacent the outer end of the rectangular rear portion 12 of the plate and midway between the flanges 14. The body of the rectangular rear portion 12 of the plate located between the flanges 14 lies in a horizontal plane with the under face in engagement with the rollers 10 so that the plate as a unit may be rotated in a horizontal plane around the fulcrum post 11 as shall be described later.

A washer 15 encircles the fulcrum post 11 and is located between the deck of the flat car B and the under face of the rectangular rear portion 12 of the plate so that the rectangular rear portion 12 lies in a horizontal plane and in slightly spaced relation from the deck of the flat car thereby preventing any possibility of the rectangular end portion 12 of the plate binding on the deck of the flat car.

Extending from the inner end of the rectangular end portion 12 of the plate is a longitudinally extending flat arm 16 which is angularly disposed relatively to the inner end of the rectangular end portion 12, and the arm 16 and the upper face of the rectangular portion 12 lie in the same horizontal plane.

The end of the arm 16 remote from the rectangular end portion 12 is provided with a transverse or laterally disposed flat arm 17 in the form of a plate of appreciable width, and the arm 17 and adjoining part of the arm 16 extend transversely across the width of the deck of the flat car A.

The laterally disposed transverse plate or arm 17 lies in the same plane as the longitudinal arm 16 and the rectangular end portion 12 of the plate, and they are formed integral with each other to constitute the plate of a desired shape, and the plate as a unit has the strength and stability to carry a loaded trailer thereon.

Co-acting with the inner edge of the arm 16 is a disc 18 of appreciable thickness, preferably constructed of metal and rigidly secured to the deck of the flat car B. By references to FIGURES 1 and 2 of the drawings it will be evident that the rectangular rear end portion 12, the flat arm 16 and the transverse arm or plate 17 may be rotated as a unit in an anti-clockwise direction around the fulcrum post 11, but the rotation in a clockwise direction is limited by the disc 18.

Adjacent to the junction of the longitudinally disposed arm 16 and the transverse arm 17 I provide a casing 19 which is hollow, and the lateral walls of the casing extend above the upper wall thereof to form lateral parallel disposed flanges 20. The end of the casing remote from the platform 12 is open as shown at 21.

The upper wall 22 of the casing 19 is formed adjacent to the end remote from the opening 21 with a transversely extending semi cylindrical projection 23 which houses the compression spring 24 mounted on the arm 25 of the lever 26.

This lever is offset intermediate of its length and pivotally mounted on the pin 27 carried by the casing 19. The end 28 of the lever 26 projects through the open end of the casing 19 and loosely embraces the pin 29 so that the pin may rotate around its vertical axis, and the pin 29 is designed to make sliding engagement with the track 30 in the loading and/or unloading railway platform C of a railway freight depot.

The track 30 is formed with ends angularly disposed towards the front of the railway platform C, and the middle portion of this track 30 is parallel with the front wall of the platform C.

The track 30 is dovetailed in cross section and the lower portion of the pin 29 is of dovetail formation so that the pin 29 on entering the track will slidably engage the track 30 of the loading platform C, and the pin 29 after entering the track cannot become disengaged from the track 30 during its progress or movement therealong, but must follow the sinuosity of the track, and the pin 29 will only become disengaged from the track 30 when it reaches the opposite end of the track.

The top of the pin 29 is formed with a slot 31 which extends diametrically across the upper end of the pin, and this slot co-acts with the stem 32 of the T-shaped locking member 33, which stem is pivotally supported from the deck of the flat car A.

This pivotal connection consists of a pair of spaced blocks 34 rigidly secured to the deck of the flat car and between these blocks the lower end of the stem 32 of the T-shaped locking member 33 is pivotally attached by the pin 35 which passes through the block 34.

When the plate which comprises the portion 12, arm 16 and transverse arm 17 is loaded and also when it is not in use, then the projecting end 28 of the lever 26 lies in close proximity to the adjacent lateral wall of the flat car B and the T-shaped lever 33 is rotated outwardly so that the stem 32 will straddle the upper end of the pin 29 and engage the transverse slot 31 in the pin 29. In this position the transverse arm of the T-shaped locking member 33 will prevent outward movement of the projecting end 28 of the lever 26.

While the T-shaped locking member 33 is in engagement with the pin 29, then the projecting end 28 of the lever 26 will be pressed in an anti-clockwise direction by the spring 24 on the end of the lever 26 remote from the projecting end 28 so that the locking member 33 will firmly retain the arm 28 against outward movement relative to the side wall of the flat car.

The height of the loading or unloading platform C of a railway depot will be the same height as the deck of a flat car so that during a loading or unloading operation of a trailer the rectangular end portion 12 and the arms 16 and 17 will not become distorted in any way due to the weight of the trailer since the rectangular portion 12 and the arms 16 and 17 form a unitary plate which lies in close proximity to the surface of the railway platform C.

The part of the platform C which is provided with the track 30, will preferably be made of hard steel, so that it will withstand wear and tear when in use.

When the unit formed of the rear portion 12 and the arms 16 and 17 is to be used in a loading operation, then as the train approaches a railroad loading or unloading depot, the trainman will release the T-shaped locking member 33 from engagement with the pin 29. Upon such release the spring 24 on the arm 25 rotates the lever 26 on the pivot pin 27 in an anti-clockwise direction, and the arm 28 is thus swung outwardly to a limited extent towards the adjacent wall of the railway loading and unloading platform C.

It will be noted that the movement of the arm 28 is limited and controlled by the lateral walls of the opening 21 in the casing 19.

As the train moves slowly alongside the railway platform C, then the pin 29 enters the flared open end of the track 30 and is trailed therealong, so that on continued forward movement of the train the pin 29 will cause the arm 28 to be moved outwardly and laterally from the flat car deck A. This movement of the arm 28 transmits a pull on the arms 16 and 17 and thus the rear rectangular portion 12 resting on the anti friction rollers 10 will be rotated around the fulcrum post 11 until the plate as a unit has been moved in an anti-clockwise direction through an arc up to but preferably less than 90°.

The arms 16 and 17 and a minor forward portion of the rectangular rear portion 12 will overlie the marginal part of the front of the loading and unloading platform C, so permitting a loading or unloading of the plate as a unit being rapidly carried out. It will be noted that the major front portion of the rectangular end portion 12 of the plate is superposed on the flat car deck and is supported by the anti friction rollers 10.

In loading a trailer it will be clear that a tractor simply backs the trailer longitudinally of the plate into position in which the rear wheels E of the trailer engage the rectangular end portion 12, and the trailer being provided with a U-shaped coupler D, is held in position by the coupler D which is swung over the fulcrum post 11.

In this loading position, the back wheels of the trailer are rigidly held in engagement with the upper face of the rectangular end portion 12 of the plate, with the wheels E positioned between the flanges 14. In the meantime the steel wheels F of the trailer are lowered to engage the transverse arm or plate 17, and the steel wheels F may be wedged or blocked in position if such is found desirable.

When this loading has been accomplished the train proceeds slowly alongside the platform C, and the pin 29 is trailed into the inclined discharge end of the track 30, and when it reaches the forward outlet end of the track 30 it will be disengaged therefrom. While the pin 29 is trailed along the inclined outlet section of the track 30, then the arm 28 and co-acting pin 29 rotates the plate comprising the rectangular portion 12, the arm 16 and the transverse arm 17 as a unit in a clockwise direction until the arm 16 engages the stop member 18 on the deck of the flat car, and in this position the plate lies wholly within the confines of the deck of the flat car.

Figure 2:
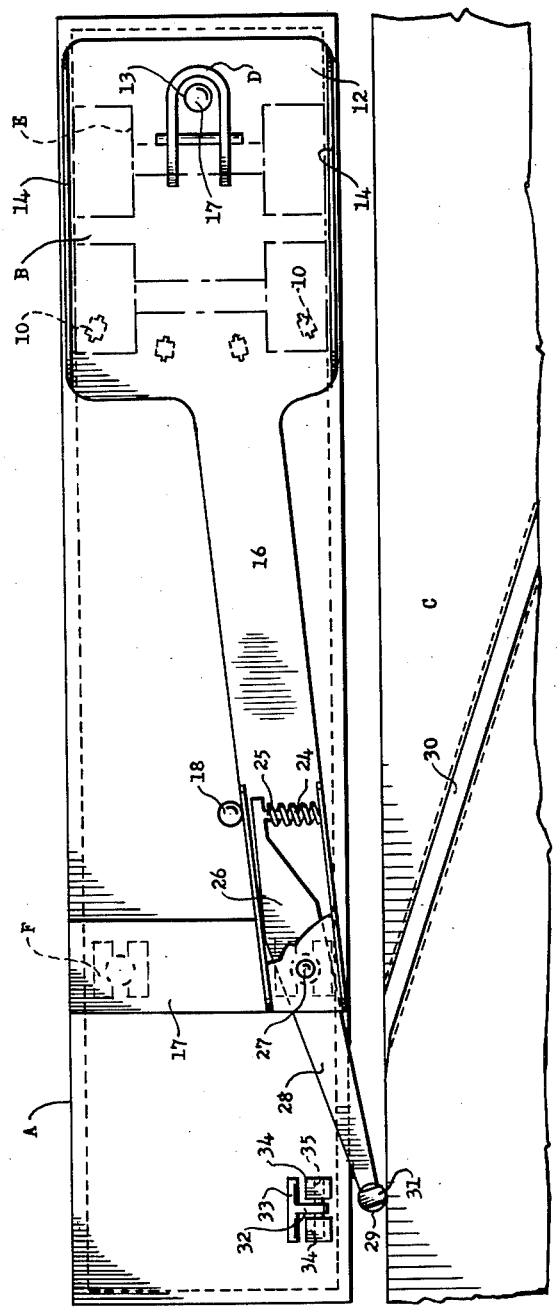
FIGURE 2 is a plan view of a railroad flat car equipped with my loading and unloading device and showing the lock released to permit of the lateral rotation of my device in a horizontal plane around a fixed fulcrum on the flat car.
Figure 3:
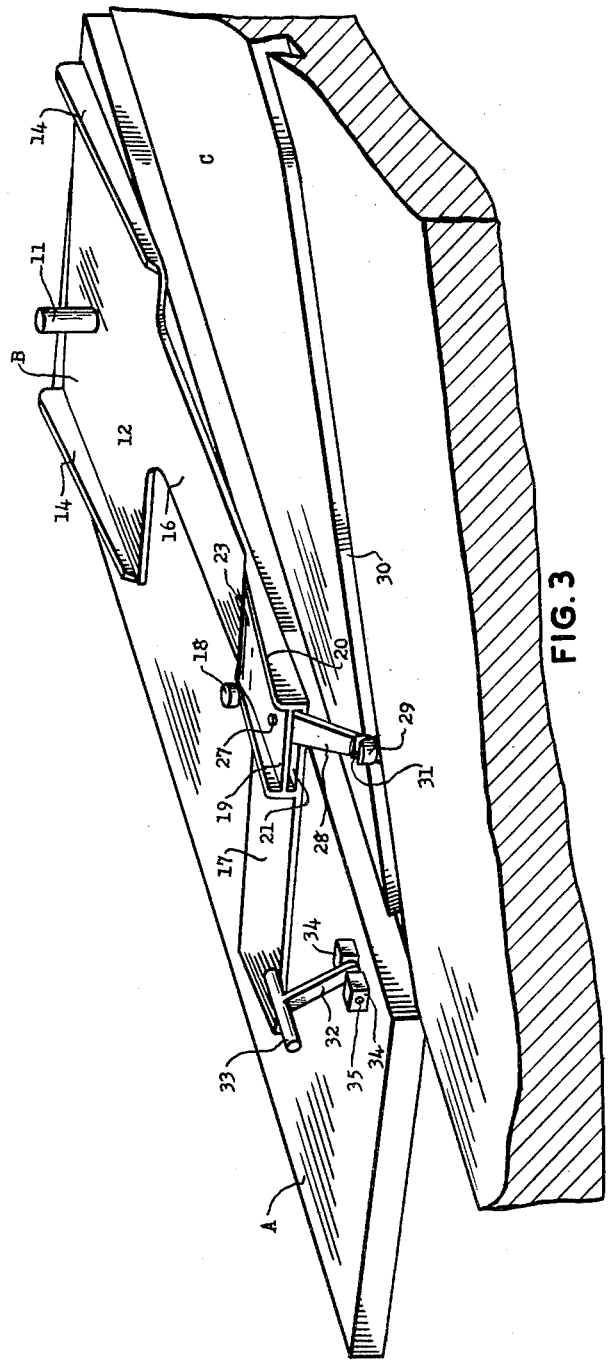
FIGURE 3 is a perspective view of the deck of a flat car showing my movable platform after unloading, and in the act of being rotated laterally on the deck of an associated flat car.
Figure 4:
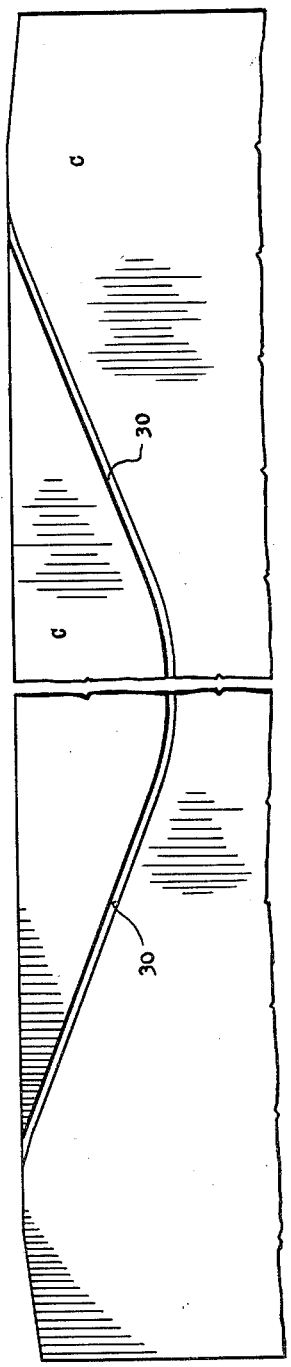
FIGURE 4 is a plan view, broken in the centre, showing an auxiliary track installed in the landing platform of a goods depot of a railroad system.
Figure 5:
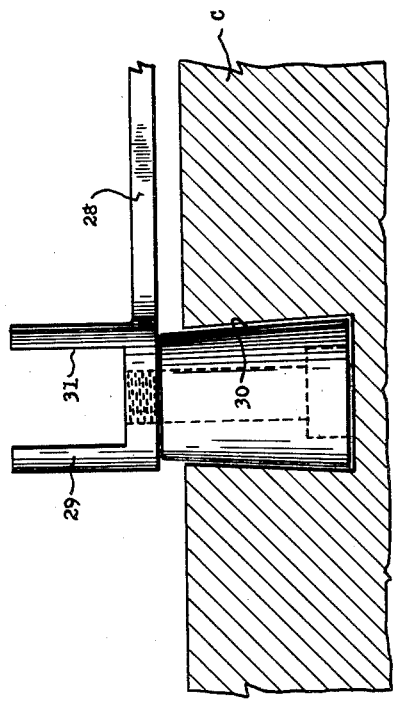
FIGURE 5 is an enlarged vertical detailed section showing the plate guide pin engaged with the platform track.

The lever 26 will now assume the position shown in FIGURE 2 of the drawings, and all that is then necessary to do is for the trainman to press the projecting end 28 of the lever 26 towards the side of the flat car to bring the pin 29 into a desired position, after which the T-shaped locking member 32 is rotated so that the stem 33 engages the recess 21 in the pin 29, and the projecting end 28 of the lever 26 is thus locked in position relatively to the side of the deck of the flat car.

In unloading a trailer at its destination, the above procedure is repeated, and when the plate comprising the rectangular portion 12, arm 16 and transverse arm 17 are rotated as a unit through an angle of approximately 90°, then the trailer may be coupled to a tractor which will unload the trailer from the flat car.

It is not necessary to redescribe the loading and unloading of a trailer on a flat car, nor is it necessary to describe the return as a unit of the plate comprising the rectangular portion 12, arm 16 and transverse arm 17 to the deck of a flat car when the plate is unloading.

The pin 29 for trailing engagement with the track 30 may be formed with a frusto conical lower end pivoted to the upper end of the pin, so that a rolling contact between the lower end of the pin and the track is assured. Or again, the arm 28 may loosely encircle the pin 29 intermediate of the height of the pin. There are various forms in which this pin 29 may be constructed so long as it insures a trailing, rolling engagement with the track 30, and eliminates any possibility of binding whatsoever.

It will thus be seen that a flat car equipped with my invention may be loaded or unloaded at any time irrespective of the position of the flat car in the make-up of a long train or its assembly, and consequently it is not necessary to spot or prearrange a particular location of trailer in a freight train in the consecutive order in which the loading or unloading of the freight train should be carried out.

By the use of my invention a great saving in man hours is made, and as the positioning of the flat car and the platform mounted thereon is accomplished and carried out by the motive power of the locomotive without additional outside help, it will be appreciated that my invention is not only practical in use but in every way efficient and economical.

What is claimed as new is:

1. The combination with a permanent loading platform having the front thereof located parallel with and adjacent to a railroad track, of a track in the platform having a middle portion disposed parallel to the front of the platform and formed with angularly disposed diverging ends extending to the front of the platform, a railroad flat car having a deck, a plate pivotally supported on the flat car deck, a longitudinal arm extending rearwardly from the plate, a lever connected to the arm, means on one end of the lever coacting with the track of the loading platform to rotate the plate in a horizontal plane about its pivotal support on the movement of the flat car relative to the platform, and releasable means for locking the lever in close engagement with the flat car.

2. The combination with a permanent loading platform having the front thereof located parallel with and adjacent to a railroad track, of a track in the platform having a middle portion disposed parallel to the front of the platform and formed with angularly disposed diverging ends extending to the front of the platform, a railroad flat car having a deck, a plate pivotally supported on the flat car deck, rollers located between the pivoted plate and the flat car deck, an arm extending angularly and rearwardly from the plate and lying in a horizontal plane therewith, a lever connected to the arm, means on the lever co-acting with the track in the platform to rotate the plate in a horizontal plane about its pivotal support on the movement of the flat car relative to the platform, and releasable means for locking the lever in close engagement with the flat car.

3. The combination with a permanent loading platform having the front thereof located parallel with and adjacent to a railroad track, of a track in the platform having a middle portion disposed parallel to the front of the platform and having diverging angularly disposed ends extending to the front of the platform, a railroad flat car, a loading plate pivotally supported on said flat car, an arm extending rearwardly from the plate and lying in the same plane therewith, a casing on the end of the arm, a lever pivotally connected intermediate of its length with the casing, resilient means co-acting with one end of the lever, means on the opposite end of the lever co-acting with the track in the platform to rotate the plate in a horizontal plane about its pivotal support on the movement of the flat car relative to the platform, and releasable means on the platform normally locking the lever in proximity to the adjacent side of the flat car.

4. The combination with a permanent loading platform having the front thereof located parallel with and adjacent to a railroad track, of a track in the platform having a middle portion disposed parallel with the front of the platform and diverging angularly disposed ends extending to the front of the platform, a railroad flat car, a flanged horizontally disposed rectangular plate pivotally supported on said flat car, an arm extending horizontally rearwardly from the rectangular plate, a transverse arm connected to the first said arm, a casing at the junction of the said arms, a lever pivotally mounted intermediate of its length in the casing, a spring co-acting with the end of the lever in the casing, a pin mounted on the opposite end of the lever to co-act with the track in the loading platform, and releasable means normally retaining the lever in close proximity to the adjacent side of the flat car.

5. The combination with a permanent loading platform having the front thereof located parallel with and adjacent to a railroad track, of a track in the platform having a middle portion disposed parallel with the front of the platform and diverging angularly disposed ends extending to the front of the platform, a railroad flat car, a plate pivotally supported on said flat car, an arm extending longitudinally rearwardly from the plate, a transverse arm connected to the end of the first arm, the plate and the two arms lying in a common horizontal plane, a casing at the junction of the two arms, a lever pivotally mounted in the casing, a spring co-acting with one end of the lever, the other end of the lever being provided with a pin to co-act with the track in the platform, a slot in the pin and a locking device on the flat car co-acting with the slot in the pin to normally retain the lever in close proximity to the adjacent side of the flat car.

References Cited in the file of this patent

UNITED STATES PATENTS

| | | |
|---|---|---|
| 1,271,812 | Wagner | July 9, 1918 |
| 1,541,457 | Winn | June 9, 1925 |
| 2,246,543 | Smith | June 24, 1941 |
| 2,835,209 | Kavanaugh | May 20, 1958 |